United States Patent [19]

Gräf et al.

[11] Patent Number: 5,395,659
[45] Date of Patent: Mar. 7, 1995

[54] PROCESS FOR MULTILAYER LACQUERING

[75] Inventors: Knut Gräf, Hattingen; Hans-Peter Patzschke; Dietrich Saatweber, both of Wuppertal; Peter Schreiber, Hattingen, all of Germany

[73] Assignee: Herberts GmbH, Wuppertal, Germany

[21] Appl. No.: 156,509

[22] Filed: Nov. 23, 1993

Related U.S. Application Data

[63] Continuation of Ser. No. 960,672, Oct. 14, 1992, abandoned.

[30] Foreign Application Priority Data

Oct. 17, 1991 [DE] Germany .................. 41 34 290.9

[51] Int. Cl.⁶ .................... B05D 1/36; B05D 7/00
[52] U.S. Cl. .................... 427/407.1; 427/409; 427/421; 427/428; 427/430.1; 427/435
[58] Field of Search ............ 427/407.1, 409, 412.1, 427/421, 428, 430.1, 435

[56] References Cited

U.S. PATENT DOCUMENTS 4,375,498  3/1983  Le Minez et al. ............ 427/410 X
4,840,715  6/1989  Misawa et al. ................ 204/181.1
4,968,399 11/1990  Tsachiga et al. ............. 204/181.1

*Primary Examiner*—Michael Lusignan
*Attorney, Agent, or Firm*—Richard A. Speer

[57] ABSTRACT

Process for multilayer-lacquering of a substrate in which the outermost layer is prepared by use of a lacquer containing one or several cationic binding agents. It is possible to apply top coat and clear lacquer films based on cationic binding agents.

22 Claims, No Drawings

PROCESS FOR MULTILAYER LACQUERING

This is a continuation of application Ser. No. 07/960,672 filed on Oct. 14, 1992, now abandoned, the text of which is hereby incorporated by reference.

BACKGROUND OF THE INVENTION

The invention relates to a process for multilayer lacquering of various substrates, in which e.g. a film of primer, optionally a film of filler with a surface lacquer or a lacquer film consisting of a base coat and after flash-off, drying or stoving, a film of clear lacquer is applied, optionally with stoving after further flash-off. The process is suitable e.g. for lacquering in the automobile industry.

SUMMARY OF THE INVENTION

The configuration of multilayer lacquer coats is known in particular in connection with automobile lacquering. In this connection a film of clear lacquer is applied dry or after brief flash-off at room temperature wet-on-wet to a base coat film, after heating to temperatures of about 160° C. If the clear lacquer consists of a one-component system containing a melamine resin, the base coat film and the film of clear lacquer are stoved jointly. If use is made of two-component clear lacquers, e.g. with a view to carrying out repairs on automobiles, curing may also be effected at room temperature. With a view to producing the base coat film, both base coats dissolved in conventional manner in organic solvents and aqueous anionic or cationic base coats may be used. In practice the aqueous base coat films are today coated with non-aqueous clear lacquers, which however give off large amounts of solvent to the ambient air.

Published specification DE-A 38 32 826 and published specification DE-A 38 34 738 also describe aqueous clear lacquer coats said to be suitable for such lacquering applications. The water solubility is achieved by neutralising carboxylic groups of the polyacrylate resins used by way of binding agents. These systems have the disadvantage of giving off amines to the air. At the same time the amine residues present in the film impair the acid catalysis necessary for cross-linking of the film, as a result of which the condensation water resistance is reduced. According to DE-OS 38 03 522 a transparent surface coat composition of the type containing organic solvent is applied to a film of water-dilutable base coat, whereby the base coat consists of an anionic acrylate resin combined with a melamine resin. The transparent surface lacquer may contain aminoalkyd resins, acrylate resins, aminoacrylate resins, oilfree alkyd resins containing amino groups and urethane resins. Examples of water-dilutable systems are not given.

It is the object of the invention to provide a lacquer system for producing outermost lacquer films e.g. a top coat lacquer (surface lacquer) or clear lacquer system suitable in practice for producing multilayer configurations without giving rise to environmental problems.

Surprisingly it has been shown that this object can be achieved by making use of a lacquer based on a cationic binding agent with a view to producing the top coat or clear lacquer films in a multilayer configuration.

Hence the object of the invention consists in a process for multilayer lacquering of a substrate, characterised in that the outermost layer is prepared by use of a lacquer containing one or several cationic binding agents.

The outermost layer may be a top coat at (surface lacquer) containing pigments and/or fillers or a transparent clear lacquer.

The lacquer containing cationic binding agents is preferably an aqueous lacquer.

With a view to bringing about a multilayer configuration the film of surface lacquer may be applied to a film of primer and/or a film of filler (surface/primer).

According to a preferred embodiment the invention relates to a process for multilayer lacquering by application of a base coat film onto a substrate to be lacquered, flash-off, drying or stoving of the base coat film and application of a film of transparent clear lacquer, optionally followed by curing after flash-off at elevated temperature, whereby a clear lacquer based on a cationic binding agent is applied. Use is preferably made of an aqueous clear lacquer based on a cationic binding agent.

DE-OS 34 36 346 describes combinations of aminoacrylate resins thermally cross-linked with blocked polyisocyanates, crosslinking agents causing transesterification and formaldehyde condensation resins and are used by way of electrophoretically separable one-coat lacquers for electrically conductive substrates. The use of such cationic combinations for multilayer configurations is not addressed.

With a preferred embodiment use is made, according to the invention, of a lacquer based on a completely or partly neutralised cationic poly(meth)acrylate-, polyester-, polyurethane- and/or polyurethanecarbamide resin and a crosslinking agent based on an amine-formaldehyde condensation resin and/or blocked polyisocyanates.

By way of cationic poly(meth)acrylate-, polyester-, polyurethane- and/or polyurethanecarbamide resin, use may for instance be made of a resin with a number average molecular weight (Mn) from 1000 to 100,000, an OH-number from 0 to 450, an amine number from 20 to 200 and a second-order transition temperature from −50° to +150° C.

DETAILED DESCRIPTION OF THE PREFERRED EMBODIMENTS

Below the resin component (poly(meth)acrylate, polyester, polyurethane, polyurethanecarbamide) is referred to as component A and the cross-linking agent as component B.

With a preferred embodiment, component A) which according to the invention is included in the lacquer is a poly(meth)acrylate resin containing basic groups which, as a result of at least partial neutralisation, form ionic salts, e.g. cation-forming groups.

The component A) poly(meth)acrylate resin containing basic groups is produced by solution polymerisation or emulsion polymerisation or copolymerisation and has a hydroxyl number from 60 to 200 but preferably 80 to 175 mg KOH per g solid resin. The number average molecular weight (Mn) is in the region from 1000 to 100,000 and preferably 4000 to 50,000 (determined by gel permeation chromatography, calibrated with the aid of polystyrene fractions). (Its viscosity preferably amounts to 0.1 to 10 Pa.s, but in particular 0.5 to 5 Pa.s in 50% solution with monoglycol ethers (especially ethoxypropanol) at 25° C. Its glass transition temperature (calculated from the glass transition temperatures of the homopolymers) is in the region of −50 to +150° C. but preferably −20 to +75° C. The appropriate average molecular weights or viscosities, respectively, can also be achieved by mixing resins of relatively high and relatively low molecular weight or viscosity. The amine number is in the region of 20 to 200 but preferably 30 to 150 and in particular 40 to 100 (mg KOH per g solid resin).

The poly(meth)acrylate resins containing the basic groups (component A) may be manufactured in accordance with the state of the art as described e.g. in DE-A 15 46 854, DE-A 23 25 177 or DE-A 23 57 152. By way of ethylene-unsaturated monomers use may virtually be made of any monomer capable of polymerisation in radicalic manner, however subject to the usual restrictions as regards copolymerisation as defined by the Q- and e-scheme according to Alfrey and Price, or as determined by the copolymerisation parameters (cf. Brandrup and Immergut, Polymer Handbuch, 2nd edition, John Wiley and Sons, New York 1975). The basic poly(meth)acrylate resin may contain, in addition to the amino groups, also onium groups such as quaternary ammonium groups and sulfonium or phosphonium groups. Particularly preferred are amino groups which, after neutralisation with organic acids, make the resin suitable for dilution with water. Such a copolymer containing amino groups and hydroxyl groups is obtained by polymerisation in solution or by emulsion polymerisation. The method of polymerisation in solution is preferred.

The poly(meth)acrylate resin of component A) is produced from (meth)acrylate monomers optionally together with additional monomers capable of polymerisation in radicalic manner. The monomers capable of polymerisation in radicalic manner, i.e. the (meth)acrylate monomers and/or other monomers capable of polymerisation in radicalic manner are monomers containing amino groups and capable of polymerisation in radicalic manner or monomers capable of polymerisation in radicalic manner containing both amino groups and hydroxyl groups. They may also be used in combination with other monomers capable of polymerisation in radicalic manner.

The preferred method in this connection is to make use of 6 to 40 parts by weight of monomers containing amino groups and capable of polymerisation in radicalic manner together with 4 to 50 parts by weight of monomers containing hydroxyl groups and capable of polymerisation in radicalic manner or 8 to 60 parts by weight of monomers containing both hydroxy and amino groups and capable of polymerisation in radicalic manner per 10 to 90 parts by weight of the monomers not containing further reactive groups and capable of polymerisation in radicalic manner. Preferably more than 50 wt.-% but in particular more than 80 wt.-% of the monomers capable of polymerisation in radicalic manner used are (meth)acrylate monomers. These (meth)acrylate monomers may e.g. contain through their ester function amino groups and/or hydroxyl groups or other non-functional monomers may be present.

In the present specification the term (meth)acrylate signifies acrylate and/or methacrylate.

With a preferred embodiment 0.1 to 7 parts by weight of the 10 to 90 parts by weight of the monomers capable of radicalic polymerisation and not containing additional reactive groups may be substituted by ethylene-polyunsaturated monomers.

By way of monomers containing amino groups use may e.g. be made of monomers according to the general formula

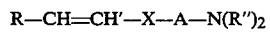

where
R=—R' or —X—$C_nH_{2n+1}$
R'=—H or —$C_nH_{2n+1}$
R''=—R', —$C_nH_{2n}OH$ and/or —$C_nH_{2n}NR_2$
and where R is defined as above and
X=—COO—, —CONH—, —$CH_2O$— or —O—,
A=—$C_nH_{2n}$— or

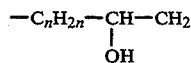

n=1 to 8, but preferably 1 to 3.

Examples of unsaturated monomers containing N-groups are N-dialkyl- or N-monoalkyl-aminoalkyl(meth)acrylate or the corresponding N-alkanol compounds such as N-diethyl-aminoethylmethacrylate or N-tert-butylaminoethylacrylate, N-dialkyl- or N-monoalkyl-aminoalkyl(meth)acrylamide or the corresponding N-alkanol compounds such as N-dimethyl-amino-ethanolacrylamide and/or heterocyclic compounds containing vinyl groups with one or several basic nitrogen atoms such as N-vinylimidazole.

Monomers containing hydroxyl groups and capable of radicalic polymerisation are e.g. such as contain, in addition to an ethylene-unsaturated group capable of polymerisation, at least one hydroxyl group attached to a linear, branched or cyclic $C_2$ to $C_{20}$ carbon structure. They are mainly unsaturated esterification products of the general formula

in which
R, R' and X are defined as above and
B is a linear or branched $C_{1-6}$-alkyl group with 1-3 OH-groups.

Particularly suitable are hydroxyalkyl(meth)acrylates such as 2-hydroxyethylacrylate, 2-hydroxy-propylmethacrylate, butanediol-1,4-monoacrylate, 2-3-dihydroxy-propylmethacrylate, pentaerythritol-monomethacrylate, polypropylene glycol monoacrylate or dihydroxy-alkyl fumarates. However, use may also be made of N-hydroxyalkyl(meth)acrylamide or N-hydroxyalkyl fumaric mono- or diamides such as N-hydroxymethyl-acrylamide or N-(2-hydroxypropyl)(meth)acrylamide. Particularly elastic characteristics can be achieved when using a reaction product of hydroxyalkyl(meth)acrylate with ε-caprolactone. Other compounds containing hydroxyl groups are allyl alcohol, monovinylether of polyalcohols, especially diols such as monovinylether of ethylene glycol or butanediol as well as allyl ethers or esters containing hydroxyl groups, e.g. 2,3-dihydroxypropyl-monoallylether, trimethylpropanemonoallylether or 2,3-dihydroxy-allyl propianate. Particularly suitable are hydroxyethyl-, hydroxypropyl- and/or butanediol-1,4-mono(meth)acrylate.

The choice of additionally usable monomers capable of radicalic polymerisation and not containing further reactive groups depends on the mechanical characteristics of the film and the compatibility of the resin combination employed. Use is made of alkylacrylates, alkylmethacrylates, dialkylmaleates and/or fumarates, with the alkyl residues consisting of 1 to 20 carbon atoms and arranged in a linear or branched aliphatic chain and/or as a cycloaliphatic and/or (alkyl)aromatic residue. "Hard" monomers with a high second-order transition temperature as polymers are e.g. monomers of vinylaromatic type such as styrene, α-substituted styrenes such as α-methylstyrene, o-, m- and p-alkylstyrenes such as vinyl toluene or p-tert-butylstyrene, halogenated vinyl benzenes such as o- or p- chlorostyrene, methacrylates with a short chain such as methylmethacrylate, ethylmethacrylate, propylmethacrylate, butylmethacrylate, cyclohexylmethacrylate, isobornylmethacrylate, dihydroxycyclo-pentadienylmethacrylate, (meth)acrylamide and/or (meth) acrylnitrile. "Soft" monomers, on the other hand, are acrylates with a long alcohol chain such as n-butylacrylate, isobutylacrylate, tert-butylacrylate, 2-ethylhexylacrylate and/or laurylacrylate. Use may also be made of unsaturated ethers such as ethoxyethylmethacrylate or tetrahydrofurfuryl-acrylate. Monomers of vinylester type, preferably vinylester-α-branched monocarboxylic acids but in particular versatic-vinylester may also be included in the polymerisation process if the reaction conditions and reaction comonomers are suitable. Ethylene-polyunsaturated monomers are compounds with at least 2 double linkages capable of polymerisation in radicalic manner according to the general formula

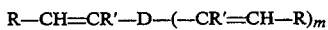

where $m=1$ to 3, and preferably $m=1$, in which R and $R^1$ are defined as above and D is the general chemical base structure for carrying the reactive double linkage. Examples of D are the m- or p-phenylene residue and residues with the formula

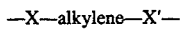

where alkylene preferably has 2 to 18 C-atoms, while X and X' are identical or different linking groups such as —O—, —COHN, —COO—, —NHCOO— or —NH—CO—NH—. D may e.g. be a benzene ring as in divinyl benzene which optionally may also be substituted such as p-methyldivinyl benzene or o-nonyl-divinyl benzene. Further examples of suitable polyunsaturated monomers are reaction products of polyalcohols especially dialcohols with α,β-unsaturated carboxylic acids as already defined. Examples thereof are ethanediol-diacrylate, ethyleneglycol-dimethylacrylate, 1,4-butanediol-diacrylate, 1,6-hexanediol-diacrylate, neopentylglycol-dimethacrylate, triethyleneglycol-dimethacrylate, polyglycol-400-diacrylate, glycerine dimethacrylate, trimethylolpropane-triacrylate and/or pentaerythritol-diacrylate. Polyfunctional monomers containing urethane- and amide groups are produced by reaction of e.g. hexanediisocyanate, β-isocyanate-ethylmethacrylate or dimethyl-m-isopropenyl-toluylisocyanate with hydroxyethyl(meth) acrylate or (meth) acrylic acid. Examples of differently structured compounds are allyl methacrylate, diallylphthalate, butanediol-vinylether, divinylethelene-carbamide, divinylpropylene-carbamide, diallylmaleate, bismaleimide, glyoxybisacrylamide and/or the reaction product of epoxide resin with (meth)acrylic acid or semifumarates. Use is preferably made of difunctional unsaturated monomers such as butanediol-diacrylate or hexanediol-diacrylate. If use is made of glycidyl-methacrylate and methacrylic acid the corresponding glycerine-dimethacrylate is automatically produced in the course of polymerisation. The reaction of built-in etherified alcoxy(meth)acrylamide with amide, a carboxyl group or a hydroxyl group can similarly be used. The type and quantity of polyunsaturated monomers must be carefully matched with the conditions of the reaction (catalysts, reaction temperature, solvents) in order to achieve the desired high viscosity without gel formation.

Copolymerisation takes place in known manner preferably by solution polymerisation with the addition of radicalic initiators as well as optionally regulators at temperatures of e.g. 50 to 160° C. It is effected in a liquid in which monomers and polymers are jointly dissolved. After polymerisation the concentration of monomers and polymers, respectively, amounts to about 50 to 90 wt.-%. Use is made preferably of solution polymerisation in organic solvents to be described in detail at a later stage, which are capable of dilution with water. In general, the solvent or solvent mixture, respectively, is heated to reaction temperature whereupon one allows the monomer mixture to flow in over a period of several hours. So as to be able to operate at reflux temperature, the initiator is matched to the boiling temperature of the solvent mixture. During this process it generally decays, its half-life being 30 minutes to 10 hours. The initiator is either dissolved cold in the monomer mixture or, for reasons of safety, added separately during the influx of the monomers. By way of catalysts soluble in organic solvents one adds peroxides and/or azo-compounds at a ratio of 0.1 to 5 wt.-% but preferably 0.5 to 3 wt.-% in relation to the quantity of monomers employed. By way of peroxides use is e.g. made of benzoylperoxide or di-tert-butylperoxide, hydroperoxides such as tert-butylhydroperoxide or cumene hydroperoxide and peresters such as tert-butylperoctate or tert-butylperbenzoate. Thermally decomposing azo-compounds are e.g. 2,2'-azo-bis-(2-cyanopropane) or 1,1'-azo-bis-cyclohexane carbonitrile. By way of initiators use may also be made of radical-forming compounds of dibenzyl type such as 1,2-bis-(4-methylphenyl)1,2-dicarbethoxy-1,2-dicyanoethane. By using regulators it is possible to reduce the molecular weight in known manner. To this end use is preferably made of mercaptanes, halogen-containing compounds and other radical-transmitting substances. Especially preferred are n- or tert-dodecyl-mercaptane, tetrakis-mercaptoacetylpenta-erythritol, tert-butyl-o-thiocresol, butene-1-ol- or dimeric α-methylstyrene. Amino-poly(meth)acrylate resins constituting component A) can also be produced by polymer-analogous reaction. It is for instance possible to react a copolymer containing acrylamide groups with formaldehyde and a secondary amine and/or amino-alcohol. An especially preferred process is described in DE-A 34 36 346. With this process one first polymerises monoethylene-unsaturated monomers containing epoxide groups into the copolymer. This is followed by reacting with excess ammonia, primary and/or secondary monoamines and/or monoamino-alcohols whereupon the excess amines are distilled off. A similar reaction may e.g. be preferably effected in equivalent quantities using ketimines of polyamines, which contain a secondary amino group and one or several primary amino groups such as monoketimine from methylisobutyl ketone and methylaminopropylamine or the diketimine of methylisobutyl ketone and diethylene triamine. Monoethylene-unsaturated monomers capable of radicalic polymerisation and containing epoxide groups are mono- and/or diglycidyl compounds of α,β-unsaturated acids, acid amides, alcohols or amines such as glycid esters of (meth)acrylic acid, fumaric acid and/or maleic acid, monoalkyl fumarate and/or maleate as well as glycidyl compounds of (meth) acrylic amide, fumaric diamide, maleic diamide or maleimide and/or glycid ether of unsaturated alcohols such as vinyl- and/or allyl-alcohol. Other suitable compounds are monoglycidyl esters of dicarboxylic monoesters with unsaturated alcohols such as allyl glycidyl phthalte. Use may however be made also of vinyl- and allyl esters or epoxidated aliphatic acids such as 2,3-epoxybutyric allyl ester or epoxystearic allyl ester. In addition, use may be made of diolefins, one of the double linkages of which has been epoxidated, e.g. vinyl ethylene oxide, 1-methyl-1-vinyl-ethylene oxide or 3,4-epoxy-1-vinyl-cyclohexane. Glycidyl acrylate and glycidyl methacrylate are preferred for copolymerisation. Generally the copolymer contains 8 to 50 wt.-% unsaturated monomers containing epoxide groups. The lower limit is preferably at 12 wt.-%, and the upper limit at 35 wt.-%. The polymerisation must have been completed before reaction with amines since otherwise reversible sub-reactions with the secondary amines occur at the activated double linkages of the monomers.

Particularly advantageous as secondary amines for reaction with the epoxide groups are secondary amines with the formula R—NH—R'
where R=—H or —R'R'=—$C_nH_{2n+1}$, —$C_nH_{2n}OH$ and/or —$C_nH_{2n}$—N=C (alkyl)$_2$ and n=1 to 8, but preferably 1 to 2 and the alkyl has 1 to 8 C-atoms.

The following amines may e.g. be used for the reaction: $C_1$ to $C_6$-dialkyl-amines with identical or different alkyl groups in the molecule such as dimethyl, diethyl, diisopropyl, dibutyl-, methylethyl-, methylpropyl-, methylbutylamine, monocycloaliphatic amines such as morpholin, piperidin, pyrrolidin and/or monoalkanolamines such as N-methylaminoethanol and/or dialkanolamines such as diethanolamine and diisopropanolamine. Examples of primary amines or aminoalcohols are $C_1$ to $C_8$-alkylamines such as ethylamine, 2-ethylhexylamine or aminoethanol. In every case preference is given to $C_1$- to $C_4$-alkyl groups, in particular $C_1$- and/or $C_2$-alkyl groups. Particularly preferred are secondary amines such as dimethylamine, diethylamine, methylethylamine or N-methylaminoethanol, inasmuch as after neutralisation they enable the production of lacquers with high pH-value and good solubility. The above-mentioned primary amines are generally used in mixtures with secondary amines as otherwise products are obtained the viscosity of which is too high.

The number of primary and/or secondary hydroxyl groups is optimised in such a way as to produce a well cross-linked film resistant to solvent when the lacquer is stoved. Bearing in mind that during the reaction with amine every epoxide group gives rise to a secondary OH-group it is advisable to include in the polymerisation process at least one further hydroxyl group per molecule, preferably a primary hydroxyl group via other unsaturated monomers. The number of epoxide groups determines the number of the amino groups reacted therewith and hence also the solubility of the product. At least one epoxide group per molecule should be present. In many cases it is advantageous to combine an increased hydroxyl number with a lower amine number and vice versa.

With another preferred process amino groups are incorporated by reacting a poly(meth)acrylate resin containing hydroxyl groups with amino compounds containing isocyanate groups. The latter are produced e.g. by reaction of 1 mol diisocyanate with 1 mol dialkylaminoalkanol.

In order to reduce the high proportion of solvent introduced into the lacquer, the alcoholic solvent of the solution polymer may optionally be distilled off under vacuum at elevated temperatures, whereupon an emulsion is produced with acid and water. Another preferred process is solution polymerisation in solvents not capable of dilution in water. This resin type is emulsified after neutralisation with acid in water whereupon the solvent is azeotropically separated with water by rotary action. If higher molecular weights are to be achieved without difficulties due to viscosity it is necessary to effect emulsion polymerisation.

As component B) use is made e.g. of di- and/or polyisocyanates, with the reactive isocyanate groups blocked by protective groups.

By way of typical diisocyanates for reacting with the polyol/diol mixture, use is made e.g. of such as are based on linear or branched aliphatic, cycloaliphatic and/or aromatic hydrocarbons with 20 to 50% NCO content. Their functional groups are two isocyanate groups asymmetrically or symmetrically arranged within the molecule. They may be aliphatic, alicyclic, arylaliphatic or aromatic.

By way of surface lacquer systems use is e.g. preferably made of diisocyanates in which the isocyanate group is not linked with an aromatic C-atom, since diisocyanates such as these are highly resistant against ultraviolet light. Examples of aliphatic diisocyanates suitable for use are such with the general formula

where m is an integer from 2 to 20 but in particular 5 to 8 and R, which may be identical or different, is a hydrogen or a low alkyl residue with 1 to 8 C-atoms but preferably a methyl group. Specially preferred are the diisocyanates with this formula, the NCO-groups of which are linked via a $CH_2$ group with a linear, branched or cylcoaliphatic but in particular unbranched linear aliphatic residue. Examples thereof are propylene diisocyanate, ethylethylene diisocyanate, dimethylethylene diisocyanate, methyltrimethylene diisocyanate, trimethylhexane diisocyanate, 1,12-dodecane diisocyanate, 1,6-bis-(isocyanate)pentane, 1,6-bis(isocyanate) hexane, 1,6-bis-(isocyanate)-2,2,4-trimethyl hexane, 1,4-bis-(2-isocyanate-ethyl)cyclohexane or 1,3-bis(2-isocyanatemethyl)cyclohexane. Examples of suitable cycloaliphatic diisocyanates are cyclopentylenediisocyanate, 1,4-bis-(isocyanate)cyclohexane, bis-(4-isocyanatecyclohexyl)methane, 5-isocyanate-3-(isocyanatemethyl)-1,1,3-trimethyl-cyclohexane or methane diisocyanate. By way of arylaliphatic diisocyanates use may be made e.g. of 1,3-bis(1-isocyanatemethyl)-benzene, 1,4-bis-(1-isocyanate-1-methylethyl) benzene or m-tetramethyl,xylylene-diisocyanate. Particularly preferred are polyester urethane resins based on 5-isocyanate-3-(isocyanatemethyl)-1,1,3-trimethylcyclohexane (=Desmodur W ®) as a mixture of varying steric configuration.

The synthesis is effected by joint reaction of the reactants in the mixture or in steps so as to achieve a sequenced structure.

However, for reaction with component A) use is preferably made of aliphatic and/or aromatic blocked polyisocyanates which are trivalent or have a higher valency, e.g. with valencies three to five but preferably trivalent, with a number average molecular weight Mn of 500 to 1500, whereby said polyisocyanates may optionally also contain amino groups.

By way of polyisocyanates the so-called "lacquer polyisocyanates" have proved particularly useful, said polyisocyanates being produced from the aliphatic diisocyanates described above.

These polyisocyanates are produced from the diisocyanates by trimerisation, reaction with water or in part reaction with trifunctional polyols and polyols of higher functionality. Examples thereof are the biuret produced from hexamethylene-diisocyanate and water, the isocyanurate of hexamethylene-diisocyanate or isophorone diisocyanate or the adduct of 3 mol isophorone diisocyanate or m-tetramethyl-xylyldiisocyanate on 1 mol trimethylol propane. Given appropriate conditions of reaction, reaction with dialkyl aminoalkanols or dialkyl aminoalkylamines yields basic "diisocyanates", whereby the alkyl groups have a linear or branched, aliphatic or cycloaliphatic structure with C-chains from 1 to 10 carbon atoms. Examples thereof are dimethyl aminopropylamine, diethyl aminoethylamine, diethyl aminoethanol or dimethyl aminoisopropanol. Suitable amino alcohols can also be produced by Michael-addition of hydroxyalkyl(meth)acrylates or hydroxyalkyl(meth)acrylamindes with secondary amines.

Another group of polyfunctional isocyanates are oxadiazinetrion-alkyl-diisocyanates which may be added to trimethylol propane. Polyisocyanates of higher functionality can also be produced by reaction of 2 mol triiso-cyanates with H-active difunctional coumpounds such as dialcohols, diamines or amino alcohols such as ethanolamines or N-methyl-diethanolamines.

The free isocyanate groups are blocked jointly or individually so as to protect them at room temperature against water or the active hydrogen atoms of the basic resin/hydroxyl- or aminehydrogen groups. Suitable blocking agents are monofunctional compounds containing acid hydrogen with only a single amine-, amide-, imide-, lactam-. thio- or hydroxyl group. In general use is made of volatile compounds containing active hydrogen, said compounds having low molecular weights of preferably not more than 300 but in particular not more than 200. They are advantageously reacted with the isocyanate groups at temperatures above 50° C. but preferably between 80° and 120° C. The quantities of blocking agent are so selected as to ensure that every NCO-equivalent is matched by an equivalent blocking agent, it being optionally possible to include conventional tertiary amines or small amounts of tin salts such as tin(II)octoate or dibutyltin-dilaurate. Appropriate blocking agents are e.g. secondary or tertiary aliphatic or cycloaliphatic alcohols such as isopropanol, tert-butanol, 2-ethylhexanol, furfurol, cyclohexanol or hydroxyalkylester, dialkylamino alcohols such as dimethylaminoethanol, oximes such as formaldehyde oxime, acetaldehyde oxime, methylethylketone oxime, cyclohexanone oxime, trimethyl-cyclohexanone oxime, 2,2,6,6-tetra-methyl-piperidone-(4)-oxime, acetophenone oxime, benzophenone oxime or diethylglyoxime, lactams such as α-caprolactam, α-valerolactam, 1-butyrolactam, pyrrolidone-2, hydroxamic acids or their esters, respectively, such as acetohydroxamic acid, benzydroxamic acid, phenols such as phenol, cresol, tert-butylphenol, dimethylaminophenol, N-alkylamides such as methyl acetamide, imidazoles such as 2-methylimidazole, imides such as phthalimide or N-hydroxy-maleimide as well as enolising compounds such as malonate, acetoacetate or NH-functional enamines. However, also β-hydroxyglycols or -glycolethers and glycolamides are recommended. Oximes and lactams are blocking agents of particular interest inasmuch as polyisocyanates blocked with these substances react at relatively low temperatures. For blocking, use may also be made of more than one type of protective group but preferably such of different reactivity. Hence it is e.g. possible to make use of a mixture of two or several differently blocked polyisocyanates or of a polyisocyanate blocked with two or several different protective groups.

With the process according to the invention, blocking agents with the formula $$X-H \tag{19}$$

are particularly preferred, where X stands for

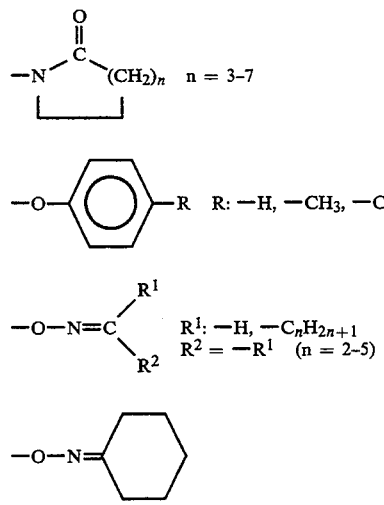

Preferred examples are ε-caprolactam, methyl-ethylketoxime and butoxy ethanol.

With a view to carrying out the blocking reaction one generally starts with the isocyanate component to which the other reactant is added. The reaction may be carried out in substance or in the presence of suitable (inert) solvents.

When manufacturing the lacquer, curing catalysts may be added with a view to accelerating a reaction between the base coat (component A) and the cross-linking agent (component B). When using blocked polyisocyanates use may be made of metallorganic catalysts such as dibutyl tin dilaurate, optionally in combination with basic catalysts such as 1,4-diazabicyclo[2.2.2]octane.

In order to formulate the clear lacquer, 20 to 60 wt.-% of blocked polyisocyanates (component B) may be mixed in, with said polyisocyanates optionally containing also amino groups. Preferred quantities are 40 to 70 wt.-% of component A and 30 to 60 wt.-% of component B in relation to the total solids content of the two binding agents. Optionally, components A) and B) can be mixed with one another cold or precondensed at elevated temperature. During this process components A) and B) may react with one another to a certain extent without the mixture losing the ability of becoming, by neutralisation, dilutable with water.

With a view to controlling the solubility characteristics and the storage life, small amounts of organic solvents may be added to the lacquer. As a rule they lend themselves to dilution with water. Their evaporation characteristics serve to affect the surface quality. Such solvents are e.g. ethylene glycol, ethoxyethanol, butoxyethanol, diethylene glycol, triethylene glycol, diethyleneglycol-dimethylether, propylene glycol, methoxypropanol, ethoxypropanol, dipropylene glycol monomethylether, dipropyleneglycol-dimethylether, diacetone alcohol, ethanol, isopropanol, n-butanol, sec.-butanol, tertbutanol, actone, methoxypropane, dioxane, tetrahydrofurane, N-methylpyrrolidone or their mixtures. With a view to improving the levelling characteristics it is also possible to add appropriate amounts of a solvent with high boiling point not soluble in water such as saturated hydrocarbons, e.g. petrol fractions, hexylene glycol, phenoxyethanol, isodecanol or 2,2,4-trimethyl-pentanediol-1,3-monoisobutyrate. The proportion of conventional organic solvents is as low as possible. In the finished lacquer it is e.g. lower than 20 but preferably lower than 15 wt.-%.

The lacquers used according to the invention may be formulated in such a way that they contain also conventional lacquer aids such as levelling-, de-airing- and ray-absorbing agents as well as agents to prevent settling. It is possible to add to the coating agents appropriate amounts of amine resins of a type generally used with lacquers such as of melamine or benzoguanamine type, in order to achieve better agreement between the application characteristics (such as spraying characteristics/resistance to incipient dissolution.

It is possible to incorporate, in conventional manner, transparent or opaque pigments into the cationic lacquers used according to the invention, i.e. the binding agents can either be pigmented direct or produced by mixing pigment pastes with complementary binding agents which are generally of dispersion-type. For colouring, use is made of transparent and opaque pigments such as described in the German standard DIN 55 944. Suitable by way of pigments are inorganic pigments such as titanium dioxide, carbon black, iron oxides and/or organic pigments such as phthalocyanine, Chinacridone and/or halogenated thioindigo pigments as well as fillers such as barium sulfate, talcum or phyllosilicates. By way of dispersion apparatus use may be made of disc-type agitators, three-roller mills, ball mills or preferably sand of pearl mills. The optimal composition of the material to be ground will depend on suitable combination of the main constituents of said material such as pigment, binding agent and solvent (water), said composition being separately determined for every type of dispersion apparatus. The dispersion process is intended to divide pigment agglomerates as far as possible into individual particles in order to enable them to achieve full optical effectiveness. In this connection it is necessary for the material to be ground to contain at least sufficient binding agent as is necessary to complete wetting of the pigment. In general it is advantageous for the operational concentrations to be as high as possible in order to ensure that a minimum of paste resin is imported into the resultant lacquer formulation. The viscosity range is chosen with a view to achieving complete dispersion in as short a time as possible. The optimal composition of the material to be ground is adjusted to the given pigment.

For surface wetting of the pigment it may be advantageous but not essential to add dispersion aids (wetting agents) to the material to be ground whereby the said dispersion aids must be such as to be adsorbed by the pigment surface while additionally promoting the wetting process by reducing the interfacial tension between pigment and binding agent. By way of wetting agents use may e.g. be made of any wetting agent conventionally employed for this purpose.

The lacquers according to the invention, both clear and top coat (surface) lacquers, are applied in conventional manner e.g. by spraying, immersion, flooding, rolling or blade coating. As regards the clear and surface lacquers the preferred film thicknesses range from about 2 to 70 μm but in particular 5 to 50 μm in relation to the thickness of the dry film. The film thickness depends on the type of application in any given case. For instance, when lacquering containers the aim is to produce films of low thickness whereas repair coatings are generally applied with higher thickness.

The lacquers applied according to the invention are generally stoved at temperatures between about 80° and 210° C. but preferably between about 110° and 165° C. Clear lacquers are preferably formulated with polyisocyanate; their stoving temperature range is preferably between about 135° and 165° C. Surface lacquers are preferably formulated with melamine resins, with the preferred stoving temperature ranging between about 110° and 145° C.

Also catalysts, preferably acid catalysts, may be added to the lacquers used according to the invention. It is particularly advantageous if the lacquers contain melamine hardeners. In this case the stoving temperatures are e.g. between about 80° and 100° C. Examples of suitable acids are acetylsalicylic acid, maleic semiesters, e.g. maleic monobutylester, phosphoric semiester, sulfonic acids such as alkyl-substituted naphthylsulfonic acid e.g. monylnaphthylsulfonic acid. For reasons of lacquer stability, the acid catalysts may be neutralised in conventional manner.

Multilayer lacquering may according to the invention be carried out wet-on-wet, it being possible e.g. to apply the surface or clear lacquers onto the preceding layer after a short period of predrying or flash-off.

The process according to the invention using surface or clear lacquers with cationic binding agents may be used generally with any type of lacquering. The process is for instance suitable for industrial production lacquering, particularly in the automobile industry or for lacquering equipment such as domestic appliances. The process according to the invention may however be applied also for repair lacquering, e.g. in the automobile industry.

The following examples serve to illustrate the invention.

Production Example 1 (amino-poly(meth)acrylate resin)

725 g butoxyethanol is heated in the presence of inert gas to 110° C., subject to the interposition of a reflux cooler. Within a period of 3 hours a mixture is added consisting of 192 g hydroxyethylacrylate, 137 g butanediol-monoacrylate, 228 g glycicyl methacrylate, 364 g 2-ethyl-hexylacrylate, 439 g butyl methacrylate, 438 g methylmethacrylate, 90 g styrene and 44 g azo-bis-isobutyronitrile. The temperature is then maintained at 110° C. for 1 hour whereupon 6 g azo-bis-isobutyronitrile is added, with this process being repeated after a further hour. After 3 hours at 110° C. measurements show that the solids content amounts to 72.2 wt.-% while after dilution to 60 wt.-% with butoxyethanol the viscosity measured at 25° C. amounts to 2.14 Pa.s. After cooling to 50° C. a mixture of 120 g diethylamine and 201 g isopropanol is quickly added (1.10 mol amine and 1.00 mol epoxide). After 30 minutes the temperature is increased to 65° C. and then maintained for 2 hours whereupon it is further increased to between 105° and 110° C. and then maintained for 3 hours. After cooling to 80° C. isopropanol and excess amine are carefully distilled off under vacuum. The solids content is adjusted to about 78 wt.-% using butoxyethanol.

Final values:
Solids content: 78.7 wt.-% (30 minutes heating to 150° C.)
Amine number: 45 mg KOH per g solids resin
Viscosity: 3.44 PA.s (60 wt.-% in butoxyethanol at 25° C.)

Production Example 2

Production of a water-dilutable silvery metallic base coat according to DE-OS 36 28 124

A) Production of component A 100 g of an anhydride mixture (SZ/H$_2$O=486) produced by reacting trimellitic anhydride with propanediol-1,2 and accordingly consisting of trimellitic anhydride and anhydrides according to the following formulae I and II . . .

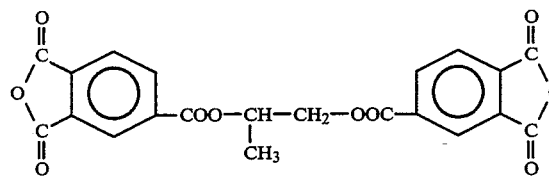
(I)

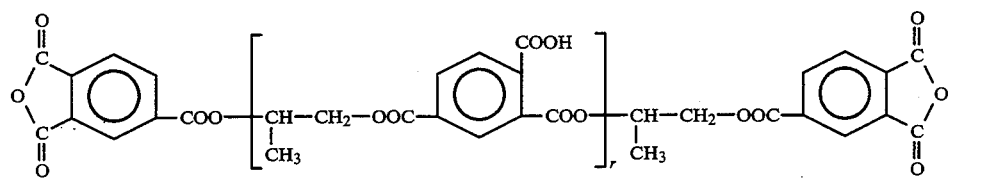
(II)

homogenised at 50° C. in 108 g xylene was introduced, drop by drop and over a period of 1 hour into a solution of 141 g of a polyester (OHZ=88) produced on the basis of phthalic anhydride, isophthalic acid, maleic anhydride, propanol and glycerine as described in DE-OS 28 11 913 in 70 g methylethyl ketone. At 90° C. stirring proceeded until the reaction mixture had attained the acid number 165 in water (100% resin). Then 12 g water were added to the mixture and after 6 hours' stirring at 80° to 90° C. the acid number 168 was attained in butanol (100% resin). The temperature of the mixture was reduced to 60° C. and after addition of 0.3 lithium benzoate 132 g of an epoxidated linseed oil (epoxide number=8.7) was added drop by drop over a period of 2 hours, the mixture being stirred until the acid number in butanol had dropped to 86.5. This was followed by stirring in a mixture of 42 g dimethylamine (60% in water) in 860 g water. The result was a bright yellow opalescent solution from which the organic solvent was distilled off at 0.1 bar and 40° C. After filtration, a yellowish, virtually clear aqueous resin solution was obtained.

Solids content: about 32% (1 hour at 125° C.). 705 g of the above aqueous (32%) dispersion and 196 g water were entered into a reactor equipped with stirrer, reflux cooler, internal thermometer and metering device for the monomers and the initiator.-This mixture was heated to 80° C. while stirring and a solution of 0.5 g ammonium peroxydisulfate in 35 g water was added. 5 minutes after adding the initiator 35 g monomer mixture of 125 g methylmethacrylate, 94 g n-butylacrylate and 17 g glycidyl methacrylate were added, and after further 15 minutes prepolymerisation the remaining quantity of monomer was added in metered doses over a period of 2 hours. 10 minutes after the last of this material had been added, further 0.2 g ammonium peroxydisulfate dissolved in 10 g water was added over a period of 10 minutes, the formulation being stirred for another 2 hours at 80° C. so as to achieve total reaction. This resulted in a stable aqueous dispersion with about 40% solids content.

B) Production of an aqueous polyurethane dispersion 250 g linear polyester (composed of adipic acid, isophthalic acid, hexanediol; OH-number 77, acid number 10) with 80 g methylethyl ketone and 53.3 g dimethylol propionic acid is introduced into a reaction vessel equipped with stirrer, internal thermometer, heater and reflux cooler. The formulation is heated to 120° C. and stirred for half an hour at this temperature. Then 146.7 g hexamethylene diisocyanate is added at 70° C. Following an exothermic phase (temperature less than 90° C.) the formulation is maintained at 75° C. until the numeric values of the residual isocyanate are below 1.8. The warm resin mixture is dispersed in 891 g deionised water and 23.5 g triethylamine subject to intense stirring, and 5 minutes after adding the resin 10.5 g propylene diamine-1,3 is added to 75 g deionised water, the formulation being stirred for another 1 hour.

This resulted in a translucent aqueous dispersion with the following characteristics:

| | |
|---|---|
| Solids content | 30% |
| Viscosity (200° C.) | 109 mPa · s |
| pH-value | 9.8 |
| Acid number | 27 (mg KOH per g solid resin) |

C) Production of a binding agent solution 50.00 parts by weight of the water-dilutable binding agent -continued

| | |
|---|---|
| | described above in connection with the production of component A are mixed with |
| 43.94 parts by weight | of water made fully free from salt and |
| 6.00 parts by weight | butoxyethanol and adjusted with |
| 0.06 parts by weight | of N-dimethyl-aminoethanol to a pH-value of 6.2–6.4 |

D) Production of an aluminium paste

| | |
|---|---|
| 20.50 parts by weight | of a conventional aluminium paste with a metal content of 65% are stirred with a mixture of |
| 7.00 parts by weight | of butoxyethanol and |
| 14.00 parts by weight | of water made fully free from salt and then combined with a mixture of |
| 10.00 parts by weight | of butoxyethanol, |
| 34.70 parts by weight | of water made fully free from salt and |
| 3.00 parts by weight | of a commercial acid acrylate thickener. Using a mixture of |
| 0.08 parts by weight | of N-dimethyl aminoethanol and |
| 0.72 parts by weight | of water made fully free from salt, the formulation is adjusted to a pH-value of 6.2–6.4. |

E) Production of a water-dilutable metallic base coat

| | |
|---|---|
| 60.00 parts by weight | of the binding agent solution described under C) are stirred for 30 minutes together with |
| 19.00 parts by weight | of the aluminium paste described under D), |
| 1.90 parts by weight | of acid acrylate thickener (commercial type) |
| 9.84 parts by weight | of water made fully free from salt and |
| 0.26 parts by weight | of N-dimethyl aminoethanol. |
| In this mixture | |
| 5.00 parts by weight | of the polyurethane dispersion described in connection with production example B are stirred in. |
| 4.00 parts by weight | of n-butanol is added and adjusted with water to a viscosity of 90–95 mPa · s at 100 sec$^{-1}$ |

The solids content amounts to 16.8 wt.-% (120 minutes in the circulation-type drying furnace at 120° C.). The viscosity is in the region of 90–95 mPa.s at 100 sec$^{-1}$.

EXAMPLE 1

Production of an aqueous clear lacquer 139 g of the amino poly(meth)acrylate resin produced in production example 1, 114 g of a commercial blocked isocyanate (B 1370 from Messrs. Hals, distilled off at 70° C. under vacuum and adjusted with butyl glycol to a solids content of 70 wt.-%) and 4.3 g lactic acid were thoroughly premixed using a laboratory stirrer and combined subject to stirring with 4.9 g of a UV-absorber of benzotriazol-type as well as with 2.5 g of a HALS-type radical scavenger (HALS=hindered amine light stabiliser). This was followed by dilution with 234 g of water made fully free from salt subject to constant stirring.

The lacquer produced had a viscosity of 29 seconds (measured in DIN-4 cup at 23° C.).

The aqueous base coat produced according to production example 2 and applied with a film thickness of about 15 μm was predried on a previously primed and filler-coated test sheet for 6 minutes at 80° C. This was followed by applying a surface film of the above aqueous clear lacquer, the thickness of this film amounting to about 40 μm. Thereupon the coating was flashed off at room temperature for 10 minutes, and after pregelling for 10 minutes at 80° C. the two films were stoved jointly for 20 minutes at 150° C.

In a constant climate according to DIN 50 017 the adhesion of the structure was good and it did not swell.

EXAMPLE 2

Production of a surface lacquer 555 g titanium dioxide is added to 945 g aminopoly(-meth)acrylate resin according to production example 1 and dispersed for 5 minutes using the dissolver. Then the paste is ground for 40 minutes at a temperature of up to 60° C. in a pearl mill. Solids: 86.6 wt.-% (after 30 minutes heating to 150° C.) Pigment/binding agent ratio=0.75:1

772 g of the paste is thoroughly stirred together with 111 g of a melamine resin of relatively high molecular weight and containing methoxyimino groups (80% dissolved in isobutanol) and 17.7 g of an amine-blocked sulfonic acid (25%) by way of catalyst under the dissolver. This is followed by further dilution subject to thorough stirring in the dissolver, the mixture being first adjusted with 7.6 g formic acid (85%) and then slowly with 142 g of water made fully free from salt to a spraying viscosity of 30 seconds in the discharge cup (DIN 53 211) and sprayed by the automatic sprayer onto primed sheets.

The top coat is predried for 6 minutes at 80° C. and then stoved for 20 minutes at 140° C.

The resultant film has a thickness of 36 m, and in a constant climate (DIN 50 017) it is free from swelling and has good adhesion.

What is claimed is:

1. A process for multilayer lacquering of a substrate, comprising:
   applying an outermost layer comprising a lacquer containing one or several cationic binding agents to a layer which has been applied by a process other than electrodeposition.

2. A process according to claim 1, wherein the outermost layer comprises a top coat based on a lacquer containing one or several cationic binding agents, pigments and optionally fillers.

3. A process according to claim 2, wherein the top coat is applied to a film of primer optionally coated with filler.

4. A process according to claim 1, comprising:
   applying as the outermost layer a transparent film of clear lacquer, whereby said clear lacquer comprises one or several cationic binding agents.

5. A process according to claim 4, comprising:
   applying a base coat film to a substrate to be lacquered, followed by flash-off, drying or stoving of the base coat film,
   applying the transparent film of clear lacquer; and
   subsequently curing at elevated temperature, optionally after exposure to air.

6. A process according to claim 1, wherein the outermost layer comprises a lacquer layer selected from the group consisting of an aqueous top coat lacquer layer and an aqueous clear lacquer layer.

7. A process according to claim 4, wherein the lacquer is an aqueous clear lacquer, wherein said aqueous clear lacquer comprises at least one member selected from the group consisting of one or several transparent pigments, UV-ray absorbing agents and conventional clear lacquer additives.

8. A process according to claim 5, wherein an aqueous base coat is used for producing the base coat film.

9. A process according to claim 2, wherein the outermost layer comprises a lacquer layer selected from the group consisting of an aqueous top coat lacquer layer and an aqueous clear lacquer layer.

10. A process according to claim 3, wherein the outermost layer comprises a lacquer layer selected from the group consisting of an aqueous top coat lacquer layer and an aqueous clear lacquer layer.

11. A process according to claim 4, wherein the outermost layer comprises a lacquer layer selected from the group consisting of an aqueous top coat lacquer layer and an aqueous clear lacquer layer.

12. A process according to claim 5, wherein the outermost layer comprises a lacquer layer selected from the group consisting of an aqueous top coat lacquer layer and an aqueous clear lacquer layer.

13. A process according to claim 5, wherein the lacquer is an aqueous clear lacquer, wherein said aqueous clear lacquer comprises at least one member selected from the group consisting of one or several transparent pigments, UV-ray absorbing agents and conventional clear lacquer additives.

14. A process according to claim 6, wherein the lacquer is an aqueous clear lacquer, wherein said aqueous clear lacquer comprises at least one member selected from the group consisting of one or several transparent pigments, UV-ray absorbing agents and conventional clear lacquer additives.

15. A process according to claim 1, wherein the outermost layer is applied by a method selected from the group consisting of spraying, immersion, flooding, rolling or blade coating.

16. A process according to one of claims 1 to 8 or 9 to 14, wherein the lacquer comprises top coat lacquer or clear lacquer based on at least one member selected from the group consisting of completely or partly neutralized cationic poly (meth)acrylate-, polyester-, polyurethane- and polyurethane-carbamide resin and a cross-linking agent based on at least one member selected from the group consisting of amine formaldehyde condensation resin and blocked polyisocyanate.

17. A process according to claim 16, wherein the cationic poly (meth) acrylate-, polyester-, polyurethane- and polyurethane-carbamide resin has an average molecular weight (Mn) from 1000 to 100,000, an OH-number from 0 to 450, an amine number from 20 to 200 and a glass transition temperature from −50° to +150° C.

18. A process according to one of claims 1 to 8 or 9 to 14 wherein the top coat or clear lacquer comprises:

A) 40 to 80 wt.-% of a cationic poly(meth)acrylate resin completely or partly neutralized with acids, said poly(meth)acrylate resin having a number average molecular weight (Mn) from 1000 to 100,000, an OH-number from 60 to 200, an amine number from 30 to 150 and a glass transition temperature from −50° to 150° C.; and B) 20 to 60 wt.-% of a blocked polyisocyanate with at least two groups per molecule capable of reacting with at least one of the amino and OH- groups of component A), whereby each of the percentages by weight of components A) and B) relate to the solid resin and add up to 100 wt.-%.

19. A process according to claim 16, wherein the top coat or clear lacquer comprises:

A) 40 to 80 wt.-% of a cationic poly(meth)acrylate resin completely or partly neutralized with acids, said poly(meth) acrylate resin having a number average molecular weight (Mn) from 1000 to 100,000, an OH-number from 60 to 200, an amine number from 30 to 150 and a glass transition temperature from −50° to 150° C.; and B) 20 to 60 wt.-% of a blocked polyisocyanate with at least two groups per molecule capable of reacting with at least one of the amino and OH- groups of component A), whereby each of the percentages by weight of components A) and B) relate to the solid resin and add up to 100 wt.-%.

20. A process according to claim 18, wherein the top coat or clear lacquer comprises:

A) 40 to 80 wt.-% of a cationic poly(meth)acrylate resin completely or partly neutralized with acids, said poly(meth)acrylate resin having a number average molecular weight (Mn) from 1000 to 100,000, an OH-number from 60 to 200, an amine number from 30 to 150 and a glass transition temperature from −50° to +150° C.; and B) 20 to 60 wt.-% of a blocked polyisocyanate with at least two groups per molecule capable of reacting with at least one of the amino and OH- groups of component A), whereby each of the percentages by weight of components A) and B) relate to the solid resin and add up to 100 wt.-%.

21. A process for applying a lacquer comprising the cationic binding agents and curing agents defined in one of claims 16 to 18 or 19 for producing, in a process of multilayer lacquering, an outermost layer of lacquer which is applied to a layer which has been applied by a process other than electrodeposition.

22. A process for applying a lacquer comprising cationic binding agents for producing, in a process of multilayer lacquering, an outermost lacquer film which is applied to a layer which has been applied by a process other than electrodeposition.

* * * * *